United States Patent [19]

Adams et al.

[11] Patent Number: 5,248,083
[45] Date of Patent: Sep. 28, 1993

[54] ADAPTIVE FURNACE CONTROL USING ANALOG TEMPERATURE SENSING

[75] Inventors: Wilmer L. Adams, Fridley; Ralph H. Torborg, Minnetonka, both of Minn.

[73] Assignee: Honeywell Inc., Minneapolis, Minn.

[21] Appl. No.: 973,794

[22] Filed: Nov. 9, 1992

[51] Int. Cl.⁵ .............................................. F23N 3/00
[52] U.S. Cl. ....................................... 236/11; 62/186
[58] Field of Search ........................... 236/11; 62/186

[56] References Cited

U.S. PATENT DOCUMENTS

| | | | |
|---|---|---|---|
| 3,870,227 | 3/1975 | Attridge, Jr. | 165/16 X |
| 3,912,162 | 10/1975 | Bauer et al. | 236/11 |
| 4,330,260 | 5/1982 | Jorgensen et al. | 431/12 |
| 4,406,397 | 9/1983 | Kamata et al. | 236/1 B |
| 4,408,711 | 10/1983 | Levine | 236/11 |
| 4,487,363 | 12/1984 | Parker et al. | 236/49 |
| 4,492,560 | 1/1985 | Sundberg | 431/12 |
| 4,583,936 | 4/1986 | Krieger | 431/1 |
| 4,676,734 | 6/1987 | Foley | 431/12 |
| 4,703,747 | 11/1987 | Thompson et al. | 126/112 |
| 4,718,021 | 1/1988 | Timblin | 364/505 |
| 4,725,001 | 2/1988 | Carney et al. | 236/11 |
| 4,795,088 | 1/1989 | Kobayashi et al. | 236/49 |
| 4,842,510 | 6/1989 | Grunden et al. | 431/19 |

Primary Examiner—William E. Wayner
Attorney, Agent, or Firm—Ian D. MacKinnon

[57] ABSTRACT

An adaptive furnace controller utilizing analog temperature sensing to maintain a constant preselected temperature in the heat exchanger during operation. The adaptive furnace control measuring heat exchanger temperature and regulating a controllable valve to adjust burner firing rate, thereby holding heat exchanger operating temperature constant. Further, creating constant on/off times based on the previous cycle on/off times of the furnace by regulating circulation blower speed. By increasing blower speeds to shorten "on" times or decreasing blower speeds to increase "on" times, and thereby achieving optimum cycle times.

9 Claims, 2 Drawing Sheets

ADAPTIVE FURNACE CONTROL USING ANALOG TEMPERATURE SENSING

FIELD OF THE INVENTION

The present invention pertains to a furnace control. More particularly, it pertains to a furnace control which utilizes the sensed air temperature in the furnace heat exchanger to control furnace output and the ratio of on/off time of each furnace cycle to control circulation blower speed.

BACKGROUND OF THE INVENTION

Most forced warm air central heating systems utilize a standard furnace to heat air which is heated within a heat exchanger and forced through duct work to areas which the furnace is to heat. Generally, this operation is based upon receiving a control signal from a thermostat which is mounted in a remote location; normally, in the area which is to be heated. The thermostat sends a control signal to the furnace and turns the furnace on or off based upon the ambient air temperature of the room which is heated. In this manner, the furnace cycles on and off, sending heated forced air to the space which is heated. Most furnaces, however, operate at a fuel input rate which provides significantly more heat than is necessary. In residential use, most furnaces are designed to heat an entire house in a short period of time. These furnaces are designed such that they may bring a house from a temperature well below the desired temperature to the desired temperature rapidly. When a furnace is being utilized strictly for the purpose of maintaining a specific temperature within a house, which is the normal function of a furnace, most furnaces are operating at, or about, 75% above the necessary fuel input level and, therefore, energy may be wasted. The object of this invention is to increase energy efficiency and provide improved temperature control (comfort) in the heated space.

SUMMARY OF THE INVENTION

The invention is a system which uses an analog temperature sensor to control furnace operation to obtain the following benefits:
improved economy,
more uniform temperature control,
improved air circulation when heating load is low,
lower noise operation, and
increased furnace life.

The invention is particularly adapted for furnaces in single zone systems. A multiple zone system is disclosed in co-pending, commonly owned, patent application entitled "Adaptive Forced Warm Air Furnace Using Analog Temperature and Pressure Sensors," Ser. No. 07/973,793, filed on the same date as the present application, and is hereby incorporated by reference. In the present single zone system, a control can be made to operate with only analog heat exchanger temperature sensing. The heat exchanger temperature is used to control the firing rate. The circulation blower speed is adjusted every cycle, according to the history of the ratio of on/off duty cycles.

The system utilizes a microprocessor to handle the blower speed; however, control of the firing rate could very easily be done in an analog manner to eliminate the need for an A/D controller. In this scheme, a thermistor sensor in, or in close proximity to, the heat exchanger senses temperature. A Modureg amplifier controls a modulating valve to control the firing rate of the burner and holds the heat exchanger temperature at a fixed setpoint. By changing the blower speed it is possible to control the heat delivery to match the heat load. Control of the blower is accomplished from a history record of the furnace on/off cycles kept in the memory of the microprocessor. At the beginning of each cycle the blower speed is adjusted to a predetermined speed. That speed will be held during the first cycle. The control algorithm is then determined empirically.

DESCRIPTION OF THE PREFERRED EMBODIMENT

Figure 1:
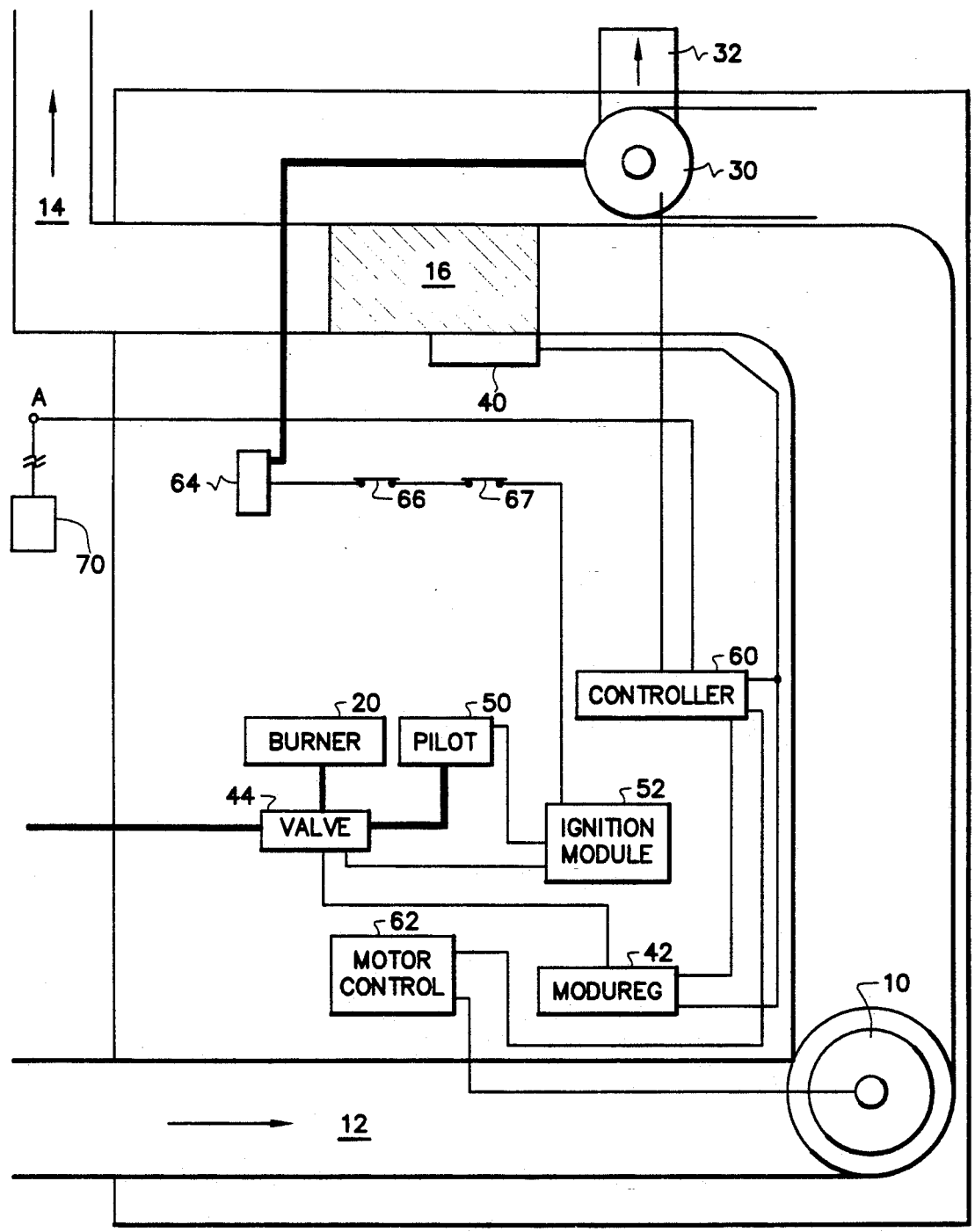
FIG. 1 illustrates a typical furnace which incorporates the invention.

FIG. 1 illustrates a furnace which incorporations the invention. The furnace comprises a circulation blower 10, a burner 20 and an induced draft blower 30. In general, the operation of Applicants' invention is similar to a standard furnace, wherein returned air from the ducts is brought into the return ducts 12 and pressurized using blower 10 so that it is forced through heat exchanger 16, warm air ducts 14 and delivered to the area to be heated. Heat exchanger 16 is heated utilizing burner 20; burner 20 generally utilizes either natural gas or oil. Burner 20 mixes and burns fuel and air which is brought through the heat exchanger 16 by induced draft blower 30. These combustion gases are then expelled out of the furnace through an exhaust chimney 32.

In normal furnace operation, burner 20 is turned on and off from an external controller, generally a thermostat located in the space the operator wishes to control the temperature. Burner 20 then runs at a preset level and blower 10 will run at full speed, providing forced air to the heated space until the thermostat is satisfied. In normal operation, the furnace has little or no control over heat exchanger temperature and blower 10 speed.

Applicants' invention operates with a similar control utilizing the thermostat; however, the thermostat does not control the speed of blower 10 or heat exchanger 16 temperature. In the operation of Applicants' invention, a temperature sensor 40, a thermistor, measures the temperature of heat exchanger 16 and provides a signal to Modureg 42. Although Applicants uses a thermistor for temperature sensor 40, any temperature sensitive means may be used, including, but not limited to, variable resistive means, thermocouples, and bimetal sensors. Modureg 42 controls when burner 20 is on and off and at what level the burner is operating in order to maintain a constant temperature at heat exchanger 16. Modureg 42, regulates valve 44 and thereby modulates burner 20 such that heat exchanger 16 is held at a constant temperature (e.g., 120° F.) during the "on" portion of the cycle. Modureg 42 is a product that receives an input from a thermistor and thereby controls a modulating gas valve accordingly. The valve control signal in this case is a variable current provided by Modureg 42. The Modureg circuit utilized in this application is manufactured by Honeywell Inc., Home and Building Controls Division. Valve 44 controls the fuel flow which is provided to burner 20 and to pilot 50. Pilot 50 is ignited by ignition module 52. Although Applicants' invention utilizes Modureg 42, Modureg 42 could be replaced by any control system that will modulate valve 44 proportional to heat exchanger 16 temperature.

Blowers 10 and 30 are controlled utilizing controller 60 and provide pressurized air for the forced air heating system and induced air draft across burner 20 respectively. Thermostat 70 provides a request for heat through node A to controller 60. Controller 60 controls blower 10 through motor control 62. Motor control 62 regulates the speed at which blower 10 is operating. Blower 10 provides forced air based on requests from the thermostat and an adaptive intelligence which allows controller 60 and motor control 62 to track the length of the cycles so that constant on/off cycles can be maintained. A microprocessor in controller 60 tracks the length of the previous on/off cycles and increases or decreases blower 10 speed such that the on/off cycles will be equal. More specifically, if the on cycle is shorter than the off cycle, blower 10 speed will be decreased so that the desired area which is to be heated is not heated as quickly, thus extending the length of the on cycle. If the on cycle, however, is longer than the off cycle, the speed of blower 10 is increased incrementally in order to heat the desired area faster, thus shortening the on cycle. By making incremental changes, controller 60 and motor control 62 are able to regulate blower 10 speed until equal on/off cycles are obtained.

In the case of initial startup, or restart after a power outage, the microprocessor located in controller 60 will not have a prior history with which to regulate the speed of blower 10 based on previous on/off cycles. In this situation, the system will start with maximum circulation blower speed and correct on the following cycle in order to establish more uniform cycle rates. A known challenge in the algorithm will be detecting setup and setback in handling these situations properly. This will be accomplished by noting unusually long and short cycles. Enough history must be kept to know how to handle these situations. Further, there will be some deviation from the algorithm due to the specific variables in the installation, closed registers and clogged filters. To accommodate these situations, there should be a manual adjustment of the authority of the control algorithm. Once that is done, the automatic adjustment will hold the on/off ratio quite constant and provide system enhancements.

A voltage proportional to heat exchanger 16 temperature is fed to a comparator to create an on/off signal to controller 60 for blower 10. This allows blower 10 to run only when the air in duct 14 is warm enough to be comfortable.

The ignition and primary safety of this system is provided by ignition module 52. Although most ignition modules known to persons skilled in the art will work satisfactorily for this invention, Applicants utilized a Model S89 ignition module produced by Honeywell Inc., Home and Building Controls Division.

Pressure switches 64 measure the differential pressures at induced draft blower 30. Pressure switch 64 measures the air pressure differential created by induced draft blower 30 with respect to the ambient air pressure. In this manner, the furnace is able to determine whether there is an adequate induced air flow to operate the furnace. If an insufficient induced air flow is present, contact 67 will open cutting off power to ignition module 52 and closing valve 44. Contact 66 opens if heat exchanger 16 temperature increases dramatically over the setpoint temperature, generally 120° F. Similar to relay 67, relay 66 shuts down ignition module 52 and closes valve 44.

Figure 2:
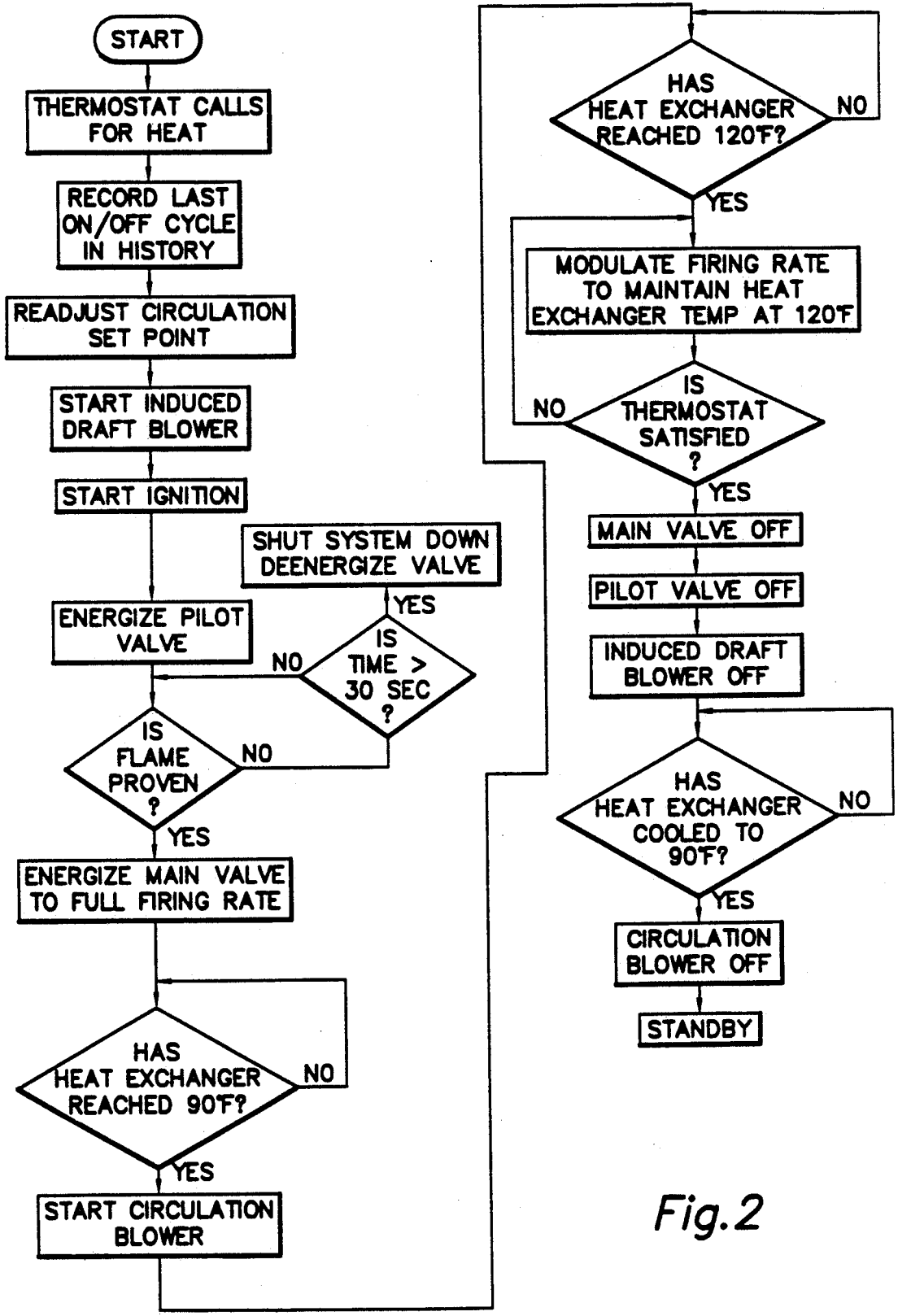
FIG. 2 is a flow diagram showing the operation of the furnace.

FIG. 2 illustrates a flow chart for the operation of the furnace. The furnace operates in a standby mode until a heating request is received from the thermostat. Upon receiving a heating request from the thermostat, the furnace records the last on/off cycle. The furnace then readjusts the circulation setpoint. Induced draft blower 30 is energized by controller 60. Ignition module 52 is then energized and valve 44 provides fuel to pilot 50. A thirty second period is then timed out while the system checks to see if a pilot flame has been proven at pilot 50. If no flame is proven after thirty seconds, valve 44 closes and the system shuts down. Upon a pilot flame being proven at pilot 50, main valve 44 provides fuel to burner 20, at which time pilot 50 ignites burner 20. A high fire period (to minimize condensation) follows while heat exchanger 16 is heated. Upon heat exchanger 16 reaching an initial temperature of 90° F., circulation blower 10 is energized by controller 60. Burner 20 continues at the maximum input rate until heat exchanger 16 reaches an operating temperature of 120° F. Upon heat exchanger 16 reaching an operating temperature of 120° F., temperature sensor 40 alerts Modureg 42 which modulates valve 44 to burner 20 in order to keep a constant temperature of 120° F. at heat exchanger 16. Upon the thermostat being satisfied, main valve 44 is turned off to both burner 20 and pilot 50. Induced draft blower 30 is then de-energized by controller 60. Heat exchanger 16 then cools to 90° F. at which time circulation blower 10 is de-energized, and the furnace returns to a standby condition.

We claim:

1. A furnace control for a forced air furnace, the forced air furnace comprising a return duct, a heat exchanger, a warm air duct, a circulation blower, and a burner, the forced air furnace receiving heating requests from an external controller wherein said furnace provides heat to an area to be heated, the burner heating the heat exchanger, the circulation blower forcing air from the return duct through the heat exchanger and out the warm air duct to the area to be heated, said furnace control comprising:

a temperature sensor for sensing air temperature in the heat exchanger;

regulation means for regulating the burner firing rate, said temperature sensor providing a signal representative of the air temperature in the heat exchanger to said regulation means, said regulation means regulating the burner firing rate such that the heat exchanger is held to a preselected temperature after reaching said preselected temperature during the external controller request for heat; and a controller for controlling the circulation blower, said controller measuring on/off time during each cycle of the furnace, and controlling the circulation-blower-speed to equalize the on/off times.

2. The furnace control of claim 1 wherein regulation means comprises:

a controllable valve; and a regulator for receiving said signal representative of the air temperature in the heat exchanger, said regulator providing a control signal to said valve.

3. The furnace control of claim 1 wherein said controller further comprises a motor control for regulating circulation-blower-speed.

4. The furnace of control of claim 3 wherein regulation means comprises:

a controllable valve; and a regulator for receiving said signal representative of the air temperature in the heat exchanger, said regulator providing a control signal to said valve.

5. The furnace control of claim 1 wherein, said controller controlling the circulation-blower-speed comprises the steps of:

receiving a heating request from an external controller;

recording previous cycle on/off time;

readjusting a setpoint for circulation-blower-speed higher if the previous cycle on time was longer than the previous cycle off time; and readjusting said setpoint for circulation-blower-speed lower if the previous cycle on time was shorter than the previous cycle off time.

6. The furnace control of claim 4 wherein said controller control of the circulation-blower-speed comprises the steps of:

receiving a heating request from an external controller;

recording previous cycle on/off time;

readjusting a setpoint for circulation-blower-speed higher if the previous cycle on time was longer than the previous cycle off time; and readjusting said setpoint for circulation-blower-speed lower if the previous cycle on time was shorter than the previous cycle off time.

7. A method for regulating circulation-blower-speed-setpoints to regulate the on/off times for each cycle of a forced air furnace comprising the steps of:

receiving a heating request from an external controller;

recording previous cycle on/off time;

readjusting the circulation-blower-speed-setpoint higher if the previous cycle on time was longer than the previous cycle off time;

readjusting the circulation-blower-speed-setpoint lower if the previous cycle on time was shorter than the previous cycle off time; and energizing the furnace until said heating request is satisfied.

8. A method of regulating a forced air furnace for a forced air furnace comprising a burner, a heat exchanger, a circulation blower, an induced draft blower, and a controllable valve; the method of regulating the forced air furnace comprising the steps of:

receiving a heating request from an external source;

energizing said induced draft blower;

regulating said valve to provide fuel to said burner;

igniting said burner;

heating said heat exchanger to a first preselected temperature;

energizing said circulation blower upon said heat exchanger reaching said first preselected temperature;

heating said heat exchanger to a second preselected temperature;

regulating said valve to maintain said heat exchanger at said second preselected temperature;

satisfying said heating request;

shutting off said valve;

de-energizing said induced draft blower; and de-energizing said circulation blower when said heat exchanger cools below said first preselected temperature.

9. The method of regulating a forced air furnace of claim 8 further comprising the steps of:

recording previous cycle on/off time;

readjusting a setpoint for circulation-blower-speed higher if the previous cycle on time was longer than the previous cycle off time; and readjusting said setpoint for circulation-blower-speed lower if the previous cycle on time was shorter than the previous cycle off time.

* * * * *